US012607802B2

(12) United States Patent
Fard et al.

(10) Patent No.: US 12,607,802 B2
(45) Date of Patent: Apr. 21, 2026

(54) RELAXED TOLERANCE ADIABATIC COUPLER FOR OPTICAL INTERCONNECTS

(71) Applicant: ARIZONA BOARD OF REGENTS ON BEHALF OF THE UNIVERSITY OF ARIZONA, Tucson, AZ (US)

(72) Inventors: Erfan M. Fard, Tucson, AZ (US); Robert A. Norwood, Tucson, AZ (US); Thomas L. Koch, Tucson, AZ (US); Stanley K. Pau, Tucson, AZ (US)

(73) Assignee: ARIZONA BOARD OF REGENTS ON BEHALF OF THE UNIVERSITY OF ARIZONA, Tucson, AZ (US)

( * ) Notice: Subject to any disclaimer, the term of this patent is extended or adjusted under 35 U.S.C. 154(b) by 245 days.

(21) Appl. No.: 18/226,354

(22) Filed: Jul. 26, 2023

(65) Prior Publication Data

US 2024/0393532 A1     Nov. 28, 2024

Related U.S. Application Data

(63) Continuation of application No. 16/481,877, filed as application No. PCT/US2018/015965 on Jan. 30, 2018, now abandoned.

(Continued)

(51) Int. Cl.
*G02B 6/12*      (2006.01)
*G02B 6/02*      (2006.01)
(Continued)

(52) U.S. Cl.
CPC ....... *G02B 6/1228* (2013.01); *G02B 6/02038* (2013.01); *G02B 6/1223* (2013.01);
(Continued)

(58) Field of Classification Search
CPC .......................... G02B 6/1228; G02B 6/02038; G02B 6/1223; G02B 6/126; G02B 6/14; G02B 2006/12061
(Continued)

(56) References Cited

U.S. PATENT DOCUMENTS 6,310,995 B1    10/2001  Saini
8,724,937 B2     5/2014  Barwicz
(Continued)

OTHER PUBLICATIONS

Dai, D et al. "Mode converter based on an inverse taper for multimode silicon nanophotonic—integrated circuits"; Optics Express, vol. 23, No. 22; Publication [online]. Oct. 21, 2015.

*Primary Examiner* — Jerry M Blevins
(74) *Attorney, Agent, or Firm* — Kaplan Breyer Schwarz LLP

(57) ABSTRACT

An optical arrangement includes an optical printed circuit board (OPCB) having at least a first optical waveguide having a first end located on the OPCB. The optical arrangement also includes at least one photonic integrated circuit (PIC) mounted to the OPCB. The PIC includes a second optical waveguide. The first waveguide has a second end located on a portion of the second waveguide to optically couple light between the PIC and the first waveguide. The portion of the second waveguide on which the second end of the first waveguide is located has an inverse taper. The inverse tapered portion is defined by a plurality of segments. The segments of the inverse tapered portion each have a length and a taper rate that causes each segment to make an equal contribution to any radiation losses in the mode transformation of light being coupled between the first and second waveguides.

22 Claims, 3 Drawing Sheets

Related U.S. Application Data

(60) Provisional application No. 62/452,284, filed on Jan. 30, 2017.

(51) Int. Cl.
| | | |
|---|---|---|
| *G02B 6/122* | (2006.01) | |
| *G02B 6/126* | (2006.01) | |
| *G02B 6/14* | (2006.01) | |

(52) U.S. Cl.
CPC ............... *G02B 6/126* (2013.01); *G02B 6/14* (2013.01); *G02B 2006/12061* (2013.01)

(58) Field of Classification Search
USPC .......................................................... 385/43
See application file for complete search history.

(56) References Cited

U.S. PATENT DOCUMENTS

| | | | |
|---|---|---|---|
| 9,618,699 B2 | 4/2017 | Tummidi | |
| 2013/0236193 A1* | 9/2013 | Sengupta ................. | G02B 6/14 |
| | | | 398/143 |
| 2014/0003765 A1 | 1/2014 | Tseng | |
| 2016/0131842 A1* | 5/2016 | Mahgerefteh ........ | G02B 6/1223 |
| | | | 385/11 |
| 2016/0266321 A1 | 9/2016 | Tummidi et al. | |
| 2016/0341896 A1 | 11/2016 | Horth | |

* cited by examiner

RELAXED TOLERANCE ADIABATIC COUPLER FOR OPTICAL INTERCONNECTS

CROSS-REFERENCE TO RELATED APPLICATION

This application is a continuation of U.S. application Ser. No. 16/481,877, filed Jul. 30, 2019, which is a 371 National stage application of PCT/US18/15965, filed Jan. 30, 2018 and claims the benefit of U.S. Provisional Application No. 62/452,284, filed Jan. 30, 2018, the contents of which are incorporated herein by reference.

GOVERNMENT FUNDING

This invention was made with government support under Grant No. FA8650-15-2-5220, awarded by Air Force Material Command. The government has certain rights in the invention.

BACKGROUND

An important problem in optical packaging involves the optical interconnection of planar-integrated photonic integrated circuits (chip-to-chip connections) and the connection of such circuits to the external world. Photonic integrated circuits (PICs) refer to waveguide-based photonic components, including optical integrated devices such as lasers, optical amplifiers, switches, filters, modulators, isolators, splitters, phase shifters, variable attenuators, detectors, and the like. PICs can also include integration with semiconductor devices such as CMOS devices. PICs allow systems with high complexity and multiple functions to be integrated on a single substrate to thereby allow the generation, detection, propagation and modulation of both optical and electrical signals. PICs may employ a variety of different material systems, including silicon (Si), silicon nitride (Si$_3$N$_4$), polymer, silicon dioxide, lithium niobate, InP, GaAs, and graphene, and optical interconnection processes should be compatible with these material systems. Existing wire bonding techniques that have been successfully applied to electrical connections in electronic integrated circuits cannot be easily extended to optical connection in a PIC. Therefore, interfacing on-chip guiding media with their on or off-chip counterparts, i.e. intra-chip, inter-chip, and chip-to-board communications is a focus of one aspect of the present disclosure.

Current interfacing technologies typically attempt to couple waveguides located on photonic chips to optical fibers or to optical modes that are similar in size to those in optical fibers. These technologies require costly high-precision and low-throughput placement tools due to the demanding tolerances in positioning accuracy to achieve efficient and low-variance coupling in manufacture. When designed to afford more relaxed tolerances in placement accuracy, these current techniques typically forfeit very high coupling efficiency and also often have a large footprint on the PIC chips and surrounding coupling apparatus, leading to higher manufacturing costs. Additionally, even with precision placement tools, these solutions often have significant polarization-dependent loss which can have an undesirable impact on system performance.

SUMMARY

In accordance with one aspect of the subject matter described herein, an optical coupler includes a photonic integrated circuit (PIC) having at least one tapered-waveguide output port. The optical coupler also includes a second waveguide that is sufficiently close to the tapered-waveguide output port to enable an adiabatic transition of an optical signal from the at least one tapered-waveguide output port to the second waveguide.

In accordance with another aspect of the subject matter described herein, an optical arrangement includes an optical printed circuit board (OPCB) having at least a first optical waveguide having a first end located on the OPCB. The optical arrangement also includes at least one photonic integrated circuit (PIC) mounted to the OPCB. The PIC includes at least a second optical waveguide. The first optical waveguide has a second end located on a portion of the second optical waveguide to optically couple light between the PIC and the first optical waveguide. The portion of the second optical waveguide on which the second end of the first optical waveguide is located has an inverse taper. The inverse tapered portion is defined by a plurality of segments. The segments of the inverse tapered portion each have a length and a taper rate that causes each segment to make an equal contribution to any radiation losses in the mode transformation of light being coupled between the first and second optical waveguides.

This Summary is provided to introduce a selection of concepts in a simplified form. The concepts are further described in the Detailed Description section. Elements or steps other than those described in this Summary are possible, and no element or step is necessarily required. This Summary is not intended to identify key features or essential features of the claimed subject matter, nor is it intended for use as an aid in determining the scope of the claimed subject matter. The claimed subject matter is not limited to implementations that solve any or all disadvantages noted in any part of this disclosure.

DETAILS OF THE INVENTION

Figure 1:
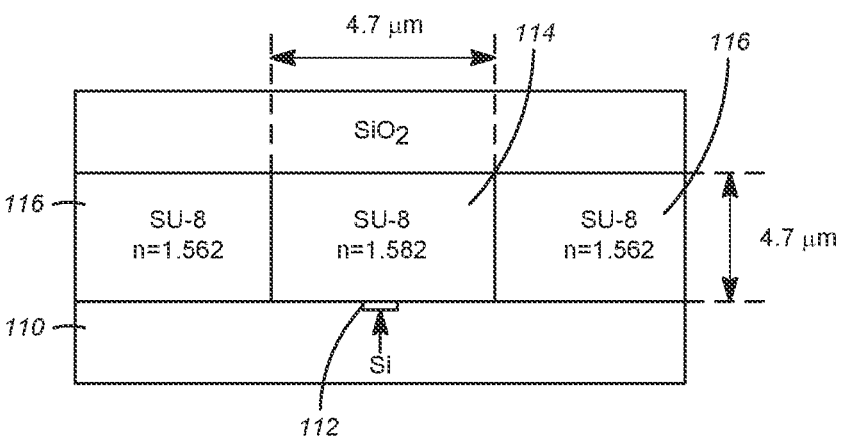
FIGS. 1 and 2 show a cross-sectional and top view, respectively, of one example of an arrangement that includes a photonic integrated circuit (PIC) (a photonic chip) mounted on an optical printed circuit board (OPCB) (not shown).

Many of the design constraints imposed on current interfacing technologies arise because they are generally concerned with coupling from semiconductor photonic chip waveguides, which typically have mode sizes that are submicron, to optical fibers or optical modes compatible with optical fibers, which typically have dimensions on the order of 5-10 microns. This mode size mismatch creates severe design constraints that can be reduced or even eliminated using the techniques described herein because optical fibers are not employed. Instead, a waveguide design is introduced that may incorporate substantially thinner and higher-index cores. This design can provide, in some embodiments, previously unattainable performance, including high efficiency coupling with substantially reduced footprint, relaxed alignment tolerances, and lower polarization dependence. These features are important for enabling high-throughput manufacturing with lower-cost, lower-precision assembly tools. Furthermore, some embodiments can accommodate short-distance inter-chip and optical printed circuit board connections.

In one aspect, the subject matter described herein encompasses a wide variety of designs that become possible without the constraint to match optical fiber modes. As illustrated below, these designs may include thin waveguide cores and taper structures that are enabled by new regimes of dimensions and/or material index contrast. In addition, these designs can offer substantial improvements in performance.

In some embodiments the performance parameters that are to be optimized when designing an optical coupler between the tapered waveguide of a photonic integrated circuit (PIC) and an interconnect waveguide may be chosen so that the coupler possesses one or more (or all) of the following attributes: high misalignment tolerance (so that it is compatible with low-cost, high-throughput placement and assembly tools); high performance (to save valuable on-chip signal power); small footprint (so that it is cost effective to produce with silicon photonics manufacturing techniques); and polarization-independence.

In some embodiments the optical coupler may employ adiabatic coupling with waveguide and taper designs that are able to optimize the aforementioned performance parameters. Adiabatic coupling introduces variations in a composite waveguide structure along the propagation length of the coupler. For an output coupler, the adiabatic coupling occurs between an initial launch waveguide and a second output waveguide, and the composite structure comprises the two waveguides positioned in close proximity and nearly in parallel along the propagation length of the waveguides. The concept of adiabatic coupling relies on making gradual changes along the length of one, or both, of these waveguides in such a manner that the fundamental optical mode is able to transition along the length of the composite structure from being primarily centered on the core of one of these waveguides to primarily being centered on the core of the second waveguide in such a way as to limit radiation loss, i.e. light escaping from the waveguide structure to free space. The aforementioned variations may be changes in the core thicknesses, widths, or index of refraction, or other physical attributes of the waveguides. To be considered adiabatic, the variations in the waveguides should be accomplished in such a gradual manner along the length so as to avoid the optical signal radiating energy out of the local fundamental mode of the composite waveguide system. Adiabatic coupling is to be distinguished from directional coupling in that the waveguide physical parameters are modified along the length of the coupler such that the optical signal remains in the fundamental mode of the composite waveguide system; in a directional coupler, light in one waveguide transfers to an adjacent waveguide, with each of the corresponding modes being distinct.

In some embodiments the adiabatic coupling is accomplished through the placement of an output waveguide approximately in parallel along the length, and in close proximity to the surface of a waveguide on a PIC, which serves as an output port for the PIC. For instance, in some cases the output waveguide preferably may be approximately parallel with the waveguide on the PIC so that an angle of less than 10 degrees is formed between them, more preferably with an angle of less than 5 degrees between them, and more preferably still with an angle of zero between them (i.e., the two waveguides are perfectly in parallel). Likewise, in some cases, depending in part on the refractive index difference between the output waveguide and the waveguide on the PIC, the distance between the two waveguides may be, for purposes of illustration, preferably less than 1000 nm, more preferably less 500 nm and more preferably still between 50-500 nm.

In some cases the variations along the length of the composite waveguide system are accomplished by tapering the width of the waveguide core on the PIC. That is, significant aspects of the optical coupler described herein are directed to the output waveguide design and to the taper designs of the waveguide on the PIC that are enabled by the output waveguide design, which together may lead to substantial improvements in adiabatic coupling performance relative to conventional optical couplers.

Figure 2:
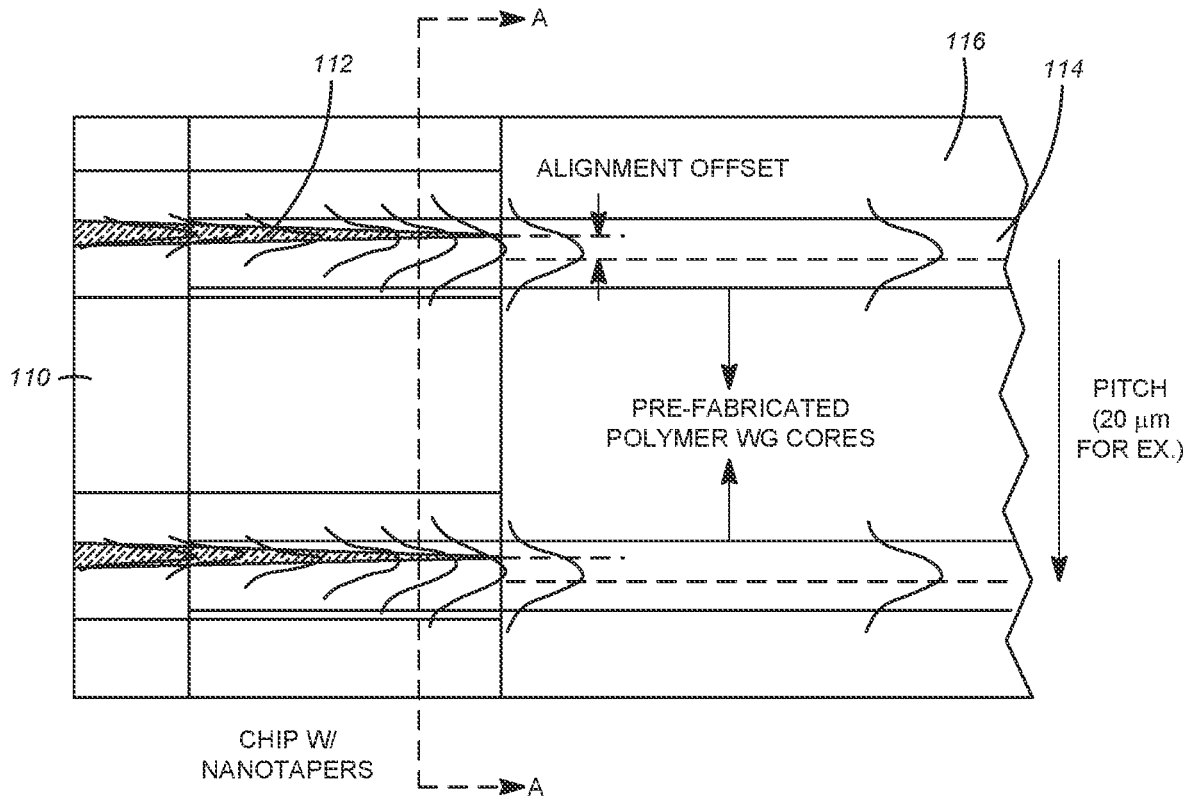

FIGS. 1 and 2 show a cross-sectional and top view, respectively, of one example of an arrangement that includes a photonic integrated circuit (PIC) (a photonic chip) mounted on an optical printed circuit board (OPCB) (not shown). In some cases the PIC may be serving as an optically enabled interposer in a stacked chip subassembly. The cross-sectional view of FIG. 1 is taken along line A-A in FIG. 2. The PIC 110 has an optical waveguide 112 with an inverse adiabatic taper for coupling light between the PIC 110 and another optical waveguide. In this example the optical waveguide that couples light to and from the tapered waveguide 112 of the PIC 110 includes a prefabricated polymer waveguide core 114 that may be formed, for example, in a substrate 116 such as a film or tape that can serve as the cladding. The film or tape with the polymer waveguide core 114 embedded therein is mounted to the OPCB such that one end overlaps with the tapered waveguide 112 of the PIC 110. The polymer waveguide core 114 is aligned with the underlying tapered waveguide 112 to within some lateral placement precision. As FIG. 2 indicates, there may be some lateral offset between the polymer waveguide core 114 and the underlying tapered waveguide 112 due to the finite lateral placement precision that can be achieved. Despite this lateral offset, mode coupling between the two waveguides is still achievable.

It should be noted that in various embodiments substrate 116 is a free-standing, self-supporting structure and is not to be construed as a thin film layer that is formed on a free-standing, self-supporting structure and which does not exist apart from the free-standing, self-supporting structure. However, as with those embodiments in which the substrate 116 is a film or tape, the substrate 116 is generally flexible, at least to some limited degree.

The cross-sectional view in FIG. 1 shows one particular embodiment that employs a silicon-based (e.g., silicon on insulator (SOI)) tapered waveguide 112 located on a PIC 110 and a polymer waveguide 116 that is fabricated, for example, from SU-8. Of course, more generally any suitable material system may be employed for the tapered waveguide such as silicon nitride, polymer, lithium niobate, InP and GaAs, for example. In addition, examples of alternative polymers 114 that may be employed for the prefabricated waveguide include, without limitation, ZPU12/ZPU13, Lightlink, Ormocer, EpoCore/EpoClad, SEO 250, MAPTMS/ZPO, polymethylmethacrylate, polycarbonate, Cytop, and RHTi1. In some embodiments a polymer material is chosen so that the refractive index difference between the core and cladding of the prefabricated waveguide is below some specified value (e.g., no more than 0.3, no more than 0.1).

Figure 3:
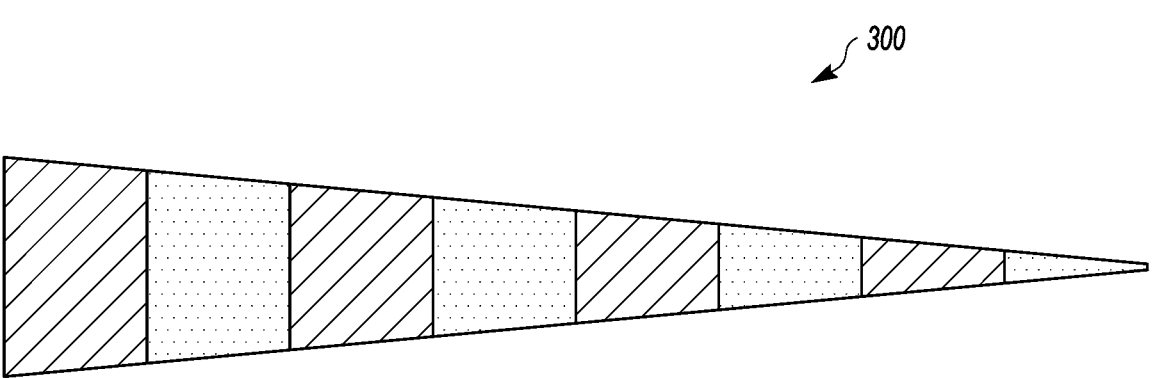
FIG. 3 shows an expanded top view of a conventional tapered waveguide (it should be noted that the aspect ratio of the tapered waveguide is not to scale).

FIG. 3 shows an expanded top view of a conventional tapered waveguide 300 (it should be noted that the aspect ratio of the tapered waveguide is not to scale). As shown, the conventional tapered waveguide has a continuous linear taper extending along its length. However, it has been found that such a linear taper may not be efficient in terms of the footprint it occupies.

Inspection of the mode profile as light travels down the tapered waveguide and couples into the polymer waveguide for different configurations and the configuration that best optimizes any desired performance parameters may be selected.

Table 1 shows one example of a segmented tapered waveguide that may be employed in the particular arrangement shown in FIGS. 1 and 2. In this example the taper is 200 μm in length and includes 8 segments. The performance values shown in Table 1 and the tables that follow are for light with a wavelength of 1550 nm. Assuming no misalignment between the two waveguides, the coupling efficiency for this design was found to be 98.465% (that corresponds to 0.067 dB of loss) for the TE polarization mode and 99.135% (that corresponds to 0.038 dB of loss) for the TM polarization mode.

TABLE 1

| SEGMENT | 1 | 2 | 3 | 4 | 5 | 6 | 7 | 8 |
|---|---|---|---|---|---|---|---|---|
| TAPER | 450 to 400 nm | 400 to 350 nm | 350 to 300 nm | 300 to 250 nm | 250 to 200 nm | 200 to 150 nm | 150 to 100 nm | 100 to 50 nm |
| TAPER TYPE | Linear | Linear | Linear | Linear | Exponential | Linear | Linear | Lin |
| SEGMENT LENGTH (μM) | 0.5 | 0.5 | 0.5 | 1.5 | 30 | 80 | 62 | 25 | or vice versa (from the polymer waveguide into the tapered waveguide) reveals that there are sections of the taper where the mode transformation is relatively small. Accordingly, in some embodiments these sections can be reduced in length so that their contribution to the undesirable radiation losses that may occur during the mode transformation process is approximately equal to that of the other segments. In addition, the taper rate and taper type (e.g., linear, exponential, etc.) may be independently determined for each segment so that this criterion is satisfied. In some embodiments this may give rise to tapers that have various combinations of segments that are linearly and exponentially tapered, tapers that have all linear segments, or tapers in which all the segments are exponentially tapered.

Figure 4:
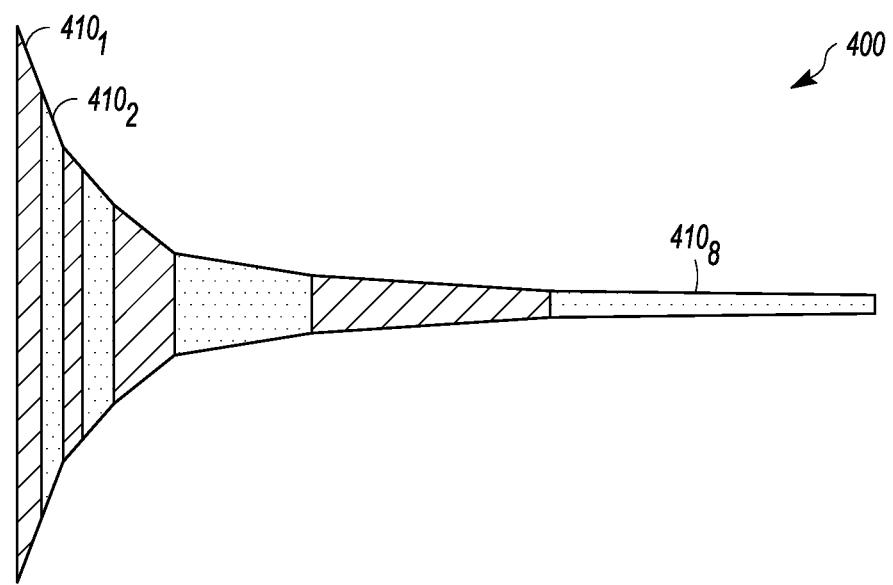
FIG. 4 shows one example of a segmented tapered waveguide in accordance with the techniques described herein.

FIG. 4 shows one example of a segmented tapered waveguide 400 that may be employed to satisfy one or both of the aforementioned criteria. In this example, for purposes of illustration only and not a limitation on the subject matter disclosed herein, 8 segments 410$_1$, 410$_2$ . . . 420$_8$ are employed. In this example the first segment 410$_1$ (the leftmost segment in FIG. 4) contributes relatively minimally to the mode transformation and accordingly is relatively short in length. On the other hand, the last segment 410$_8$ (the rightmost segment in FIG. 4) makes a much larger contribution to the mode transformation and therefore is larger in length. Moreover, as shown, in this example selected ones of the segments have an exponential taper, whereas the remaining segments have a linear taper. As noted above, the length and width change of each segment in such an example is adjusted so that each section contributes an approximately equal amount to the total radiation loss of the tapered waveguide adiabatic transition.

The configuration of each segment of any given taper, such as their individual lengths, thicknesses, widths and tapering algorithms (e.g., linear, exponential with various values of the argument), may be chosen using any suitable means. For instance, commercially available software may be employed to simulate the propagation of light through the various waveguide materials. Simulations may be executed Table 2 shows another example of a segmented tapered waveguide that may be employed in the particular arrangement shown in FIGS. 1 and 2. This example assumes that there is no misalignment between the tapered waveguide and the overlying polymer waveguide. In this example the taper is only 96 μm in length and includes 4 segments.

TABLE 2

| SEGMENT | 1 | 2 | 3 | 4 |
|---|---|---|---|---|
| TAPER | 450 to 350 nm | 350 to 250 nm | 250 to 150 nm | 150 to 50 nm |
| TAPER TYPE | Linear | Linear | Linear | Linear |
| SEGMENT LENGTH (μM) | 1 | 10 | 60 | 25 |

The polymer waveguide that in part overlies the tapered waveguide can be tailored to the particular taper design that is employed. For instance, it has been found that for some embodiments a reduction in the thickness of the polymer waveguide core can significantly increase the coupling efficiency. This is illustrated in Table 3 for a taper with four segments having a thickness of 2 μm and 1.4 μm. As shown, when the thickness of the polymer is reduced to 1.4 μm, the coupling efficiency increases to 99.253% (that corresponds to 0.032 dB of loss) for the TE polarization mode and 98.074% (that corresponds to 0.084 dB of loss) for the TM polarization mode.

TABLE 3

| # of segments | 1 | 4 | 4 |
|---|---|---|---|
| Polymer thickness | 2 μm | 2 μm | 1.4 μm |
| Taper length | 200 μm | 95 μm | 96 μm |
| TE coupling efficiency | 92.335% | 93.305% | 99.253% |
| TM coupling efficiency | 98.992% | 94.012% | 98.074% |

7

8

In some embodiments the thickness of the polymer waveguide core is preferably less than about 3 μm, and more preferably less than 2 μm.

Figure 5:
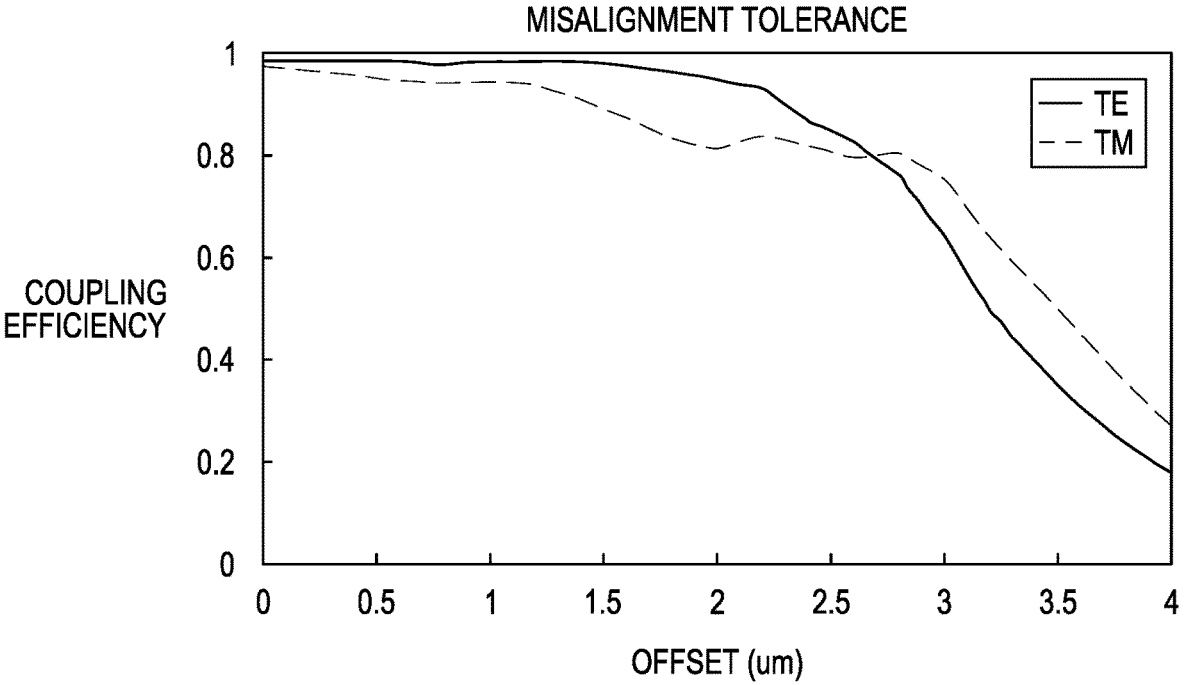
FIG. 5 shows a graph of the coupling efficiency as a function of the lateral misalignment between the polymer and the tapered silicon waveguide for the TE and TM polarization modes.
Figure 6:
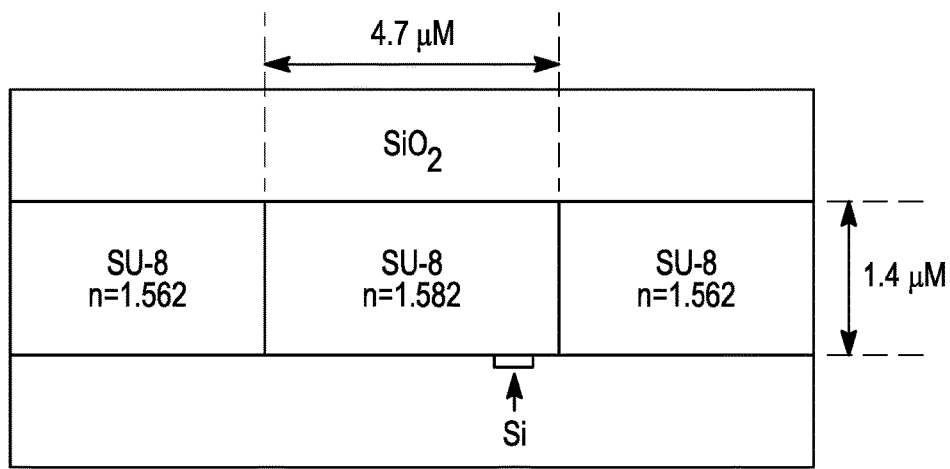
FIG. 6 shows a cross-sectional view of an arrangement similar to that shown in FIG. 1, except with a misalignment between the optical waveguide of the PIC and the polymer waveguide.

FIG. 5 shows a graph of the coupling efficiency as a function of the lateral misalignment between the polymer and the tapered silicon waveguide for the TE and TM polarization modes (see the cross-sectional view of FIG. 6, which illustrates the misalignment). As the graph indicates, the coupler exhibits less than 0.1 dB excess loss with a lateral misalignment of +/−1.8 μm between the polymer and the tapered silicon waveguide for the TE polarization mode, and 0.1 dB excess loss with +/−1.2 μm offset for the TM polarization mode. Even a misalignment of +/−2.75 μm and +/−2.9 μm exhibits less than 1 dB of additional loss for the TE and TM polarization modes, respectively. The coupler exhibits almost no loss when the polymer and silicon waveguides are aligned. Table 4 shows the coupling efficiency when there is no offset and a 2.5 μm offset.

TABLE 4

| | TE coupling efficiency | TM coupling efficiency |
|---|---|---|
| No offset | 98.4% | 97.1% |
| 2.5 μm offset | 84.6% OR 0.65 dB additional loss | 80.5% OR 0.81 dB additional loss |

In one example, the V-number for the segmented waveguide may be in the range of 0.2-20 for the vertical direction and 0.1-20 for the horizontal direction. The vertical direction refers to the direction normal to the surface of the PIC and the horizontal direction refers to the orthogonal direction. A segmented waveguide configured in this manner will give rise to a significant amount of optical coupling. The V-number in one direction is defined to be $$V = 2\pi d/\lambda * sqrt(n_1^2 - n_2^2)$$

where d is the thickness of the slab, $\lambda$ is the wavelength of light, $n_1$ and $n_2$ are the core and cladding refractive indices.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

The invention claimed is:

1. An optical coupler, comprising:

a photonic integrated circuit incorporating at least one tapered-waveguide output port; and a second waveguide, the at least one tapered-waveguide output port and the second waveguide being sufficiently close such that adiabatic coupling is achievable therebetween, wherein the tapered waveguide has a V-number between 0.2-20 in a vertical direction and between 0.1-20 in a horizontal direction.

2. The optical coupler of claim 1, wherein the tapered-waveguide output port includes an inverse tapered portion having a plurality of segments, at least one of the segments being a linear taper and the inverse taper of at least another of the segments being an exponential taper.

3. The optical coupler of claim 1, wherein the tapered waveguide output port is an Si-based or Si3N4-based waveguide.

4. The optical coupler of claim 1, wherein the second optical waveguide is a prefabricated polymer waveguide.

5. The optical coupler of claim 1, wherein the tapered-waveguide output port includes an inverse tapered portion having a plurality of segments, wherein the segments of the inverse tapered portion each have a length and a taper rate that causes each segment to make an equal contribution to any radiation losses in the mode transformation of an optical signal being coupled between the first and second optical waveguides as the optical signal undergoes an adiabatic transition.

6. The optical coupler of claim 1, wherein the tapered waveguide output port and the second waveguide are formed from different materials.

7. The optical coupler of claim 1, wherein the second optical waveguide is a prefabricated polymer waveguide.

8. The optical coupler of claim 1, wherein the tapered-waveguide output port includes an inverse tapered portion having a plurality of segments, the length and taper rate of each of the segments being selected to compensate for misalignment between the tapered waveguide output port and the second waveguide.

9. The optical coupler of claim 1, wherein the tapered-waveguide output port includes an inverse tapered portion having a plurality of segments, all of the segments being a linear taper.

10. The optical coupler of claim 1, wherein the tapered-waveguide output port includes an inverse tapered portion having a plurality of segments, all of the segments being an exponential taper.

11. The optical coupler of claim 1, wherein the second waveguide is located up to a limit of 1000 nm of, and substantially in parallel with, the at least one tapered-waveguide output port, wherein the second waveguide has a core thickness less than 5 microns and a lateral offset with respect to the at least one tapered-waveguide output port of between 1 and 4 microns.

12. The optical coupler of claim 11, wherein the second waveguide is located within 500 nm of the at least one tapered-waveguide output port.

13. An optical arrangement, comprising:

an optical printed circuit board (OPCB) having at least a first optical waveguide having a first end located on the OPCB;

at least one photonic integrated circuit (PIC) mounted to the OPCB, the PIC including at least a second optical waveguide, the first optical waveguide having a second end located on a portion of the second optical waveguide to optically couple light between the PIC and the first optical waveguide; and wherein the portion of the second optical waveguide on which the second end of the first optical waveguide is located has an inverse taper, the inverse tapered portion being defined by a plurality of segments, wherein the segments of the inverse tapered portion each have a length and a taper rate that causes each segment to make an equal contribution to any radiation losses in the mode transformation of light being coupled between the first and second optical waveguides.

14. The optical arrangement of claim 13, wherein the inverse taper of at least one of the segments is a linear taper and the inverse taper of at least another of the segments is an exponential taper.

15. The optical arrangement of claim 13, wherein the second optical waveguide is an Si-based or Si3N4-based waveguide.

16. The optical arrangement of claim 13, wherein the first optical waveguide is a prefabricated polymer waveguide.

17. The optical arrangement of claim 13, wherein the inverse tapered portion of the second optical waveguide is sufficiently close to the second end of the first optical waveguide such that adiabatic coupling is achievable therebetween.

18. The optical arrangement of claim 13, wherein a coupling efficiency for TE and TM modes are in a range between 70-100% for an offset misalignment of 3-10 microns.

19. The optical arrangement of claim 13, wherein a pitch between the first and second optical waveguide is at least 20 microns.

20. A method forming an optical interconnect to a photonic integrated circuit (PIC), comprising:

attaching a photonic integrated circuit (PIC) to an optical printed circuit board (OPCB), the PIC including at least a second optical waveguide, applying a substrate having a first optical waveguide formed therein to the OPCB such that a first end of the first optical waveguide is located on the OPCB and a second end of the first optical waveguide is located on a portion of the second optical waveguide to optically couple light between the PIC and the first optical waveguide; and wherein the portion of the second optical waveguide on which the second end of the first optical waveguide is located has an inverse taper, the inverse tapered portion being defined by a plurality of segments, wherein the segments of the inverse tapered portion each have a length and a taper rate that causes each segment to make an equal contribution to any radiation losses in the mode transformation of light being coupled between the first and second optical waveguides.

21. The method of claim 20, wherein the substrate is a film or tape in which the first optical waveguide is prefabricated.

22. The method of claim 20, wherein applying the substrate to the OPCB includes applying the substrate such that the inverse tapered portion of the second optical waveguide is sufficiently close to the second end of the first optical waveguide such that adiabatic coupling is achievable therebetween.

* * * * *